(12) United States Patent
Shellhammer et al.

(10) Patent No.: US 7,039,358 B1
(45) Date of Patent: May 2, 2006

(54) COEXISTENCE TECHNIQUES IN WIRELESS NETWORKS

(75) Inventors: Stephen J. Shellhammer, Lake Grove, NY (US); Jacob Sharony, Dix Hills, NY (US); Anthony D. Biuso, South Setauket, NY (US); Sean A. Connolly, Stony Brook, NY (US); William Sackett, Rocky Point, NY (US); Joseph Cabana, Centereach, NY (US); Patrick Tilley, Coram, NY (US); Robert Beach, Los Altos, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 499 days.

(21) Appl. No.: 09/714,803

(22) Filed: Nov. 16, 2000

Related U.S. Application Data

(60) Provisional application No. 60/175,262, filed on Jan. 10, 2000, provisional application No. 60/196,979, filed on Apr. 13, 2000.

(51) Int. Cl.
*H04B 7/00* (2006.01)

(52) U.S. Cl. .................................. 455/41.2; 455/426.1

(58) Field of Classification Search ...... 455/41.1–41.3, 455/561, 414.1, 414.4, 454, 462, 463, 554.1, 455/554.2, 552.1, 426.1, 426.2, 435.1–435.3, 455/448, 450, 466, 560, 556.1, 90.1; 343/701, 343/702
See application file for complete search history.

(56) References Cited

U.S. PATENT DOCUMENTS

| | | | |
|---|---|---|---|
| 5,610,386 A * | 3/1997 | Ball et al. ............... | 235/462.44 |
| 6,023,241 A * | 2/2000 | Clapper ................. | 342/357.13 |
| 6,047,165 A * | 4/2000 | Wright et al. ............... | 455/66.1 |
| 6,326,926 B1 * | 12/2001 | Shoobridge et al. ........ | 343/702 |
| 6,377,608 B1 * | 4/2002 | Zyren ......................... | 375/132 |
| 6,414,643 B1 * | 7/2002 | Cheng et al. ............... | 343/702 |
| 6,452,910 B1 * | 9/2002 | Vij et al. ..................... | 370/310 |
| 6,477,378 B1 * | 11/2002 | Halminen ................... | 455/450 |
| 6,526,264 B1 * | 2/2003 | Sugar et al. ................... | 455/84 |
| 6,529,584 B1 * | 3/2003 | Ravago et al. ............. | 379/67.1 |
| 6,531,985 B1 * | 3/2003 | Jones et al. .................. | 343/702 |
| 6,560,443 B1 * | 5/2003 | Vaisanen et al. .............. | 455/73 |

FOREIGN PATENT DOCUMENTS

EP 1119137 * 7/2001

* cited by examiner

*Primary Examiner*—Charles Craver
(74) *Attorney, Agent, or Firm*—Baker Botts LLP

(57) ABSTRACT

Techniques are provided for frequency coordination among two different wireless network protocols, such as the IEEE 802.11 and Bluetooth protocols, operating in proximity with one another. Coordination is accomplished by the use of a first radio transceiver operating in accordance with a first communication protocol (which may be the 802.11 protocol) and using a frequency band (which may be the 2.4 GHz band), a base station connected to a wired network and operating in accordance with the first communication protocol, a second radio transceiver operating in accordance with a second communication protocol (which may be the Bluetooth protocol) and using the frequency band, and a coordinator associated with the base station for, in turn, activating the first radio transceiver, deactivating the first radio transceiver, activating the second radio transceiver, and deactivating the second radio transceiver.

31 Claims, 4 Drawing Sheets

COEXISTENCE TECHNIQUES IN WIRELESS NETWORKS

BACKGROUND OF THE INVENTION

This application claims the benefit of provisional application Ser. No. 60/175,262, filed Jan. 10, 2000 and Ser. No. 60/196,979, filed Apr. 13, 2000. This invention relates to wireless data communications networks, and in particular to arrangements for ensuring coexistence between wireless networks that share the same frequency band with different operating protocols.

Wireless devices communicate with one another using agreed-upon protocols that are transmitted in predefined frequency bands. Often, devices using one or more wireless protocols may operate by transmission within the same frequency band. It is therefore necessary to develop coordination techniques in order for devices using one or more wireless protocols to efficiently operate in the same band of frequencies at the same time.

For example, the assignee of the present invention supplies wireless data communications systems known as the Spectrum 24® System that follows the communications protocol of IEEE 802.11 Standard (802.11), which is hereby incorporated by reference. In the system as implemented, mobile units (MUs) are in data communication with a central computer through one or more access points (APs). The APs may communicate with a computer directly or over an Ethernet wired network. Each of the MUs associates itself with one of the APs. As defined in 802.11, this communications protocol uses the 2.4 GHz ISM frequency band.

As currently designed, 802.11 devices may use several predefined methods for transmission within the 2.4 GHz band to perform as a wireless local area network. One method is to use a frequency hopping spread spectrum (FHSS) mechanism wherein data is transmitted for a certain period of time in a particular channel and, following a pseudorandom sequence, continues transmission at a different channel for the same predetermined length of time. As currently designed, 802.11 devices operate at a frequency hopping rate of 10 hops/second. Another method is to use a direct sequence spread spectrum (DSSS) mechanism wherein the data is transmitted in a predetermined frequency channel and is multiplied by a pseudorandom chipping sequence during transmission.

As all 802.11 devices use the same ISM frequency band, interference among these devices is minimized by use of a Carrier Sense Multiple Access/Collision Avoidance (CSMA/CA) protocol. Under CSMA/CA, an 8021.11 device listens for another's devices transmission prior to initiating its own transmission. If no other transmission is detected, the device transmits its information and waits for an acknowledgment (ACK) from the receiving device. If no acknowledgment of receipt is received after a pre-determined time interval, the device will retransmit after waiting for a randomly chosen interval of time. Thus, if two or more devices began transmitting coincidentally at the same time and the resulting interference blocks all of the transmissions, each device will wait a random amount of time to attempt a retransmission. This allows the devices to transmit at different times.

Another example of a wireless specification that also uses the 2.4 GHz ISM frequency band is Bluetooth™, which is designed for communication among devices within a short range transmitting at a lower power level. The Bluetooth specification, version 1.1, which would be known to one of ordinary skill in the art, is fully incorporated herein by reference. As currently designed, Bluetooth operates using a frequency hopping spread spectrum mechanism at a rate of 1600 hops/second. Bluetooth uses a master/slave system of communication. One example of a Bluetooth network may be a mobile device attached to the user's belt that communicates with a cordless scanner for reading bar codes and worn by the user as a ring. In this case, the mobile device would operate as the master and the cordless ring scanner would operate as the slave. In this system for data transmission, the master and slave only communicate at predefined intervals. At the first interval, the master may communicate to a first slave device, which may only respond during the second interval. At the third interval, a master may communicate to a second slave device, which may only respond during a fourth interval. By using this system, it is ensured that only one device within a particular Bluetooth "piconet" is transmitting at any particular time. Thus, interference is minimized.

Additionally, it is desirable for one Bluetooth piconet to operate in close proximity with another, separate Bluetooth piconet. Because there are 79 different frequency channels used by Bluetooth, different Bluetooth networks are unlikely to be operating on the same frequency at the same time. Interference between the separate Bluetooth piconets is thus minimized. This allows, for example, multiple individuals working in close proximity with one another to each have his or her own mobile unit along with a cordless ring scanner.

Along with the need to operate multiple networks of the same protocol in close proximity, there is also a recognized need in the art to coordinate the transmissions of devices operating under different protocols that use the same frequency band. For example, it may be desirable to use a cordless ring scanner that communicates with belt-mounted terminal using the Bluetooth protocol while the same belt mounted terminal communicates with an access point using the 802.11 protocol. For example, once the user scans a bar code using the cordless ring scanner, the bar code information may be sent to the belt-mounted terminal. That bar code information may then be transmitted to the 802.11 AP. Then an acknowledgment, and possibly a message, may need to be sent from the AP back to the belt-mounted terminal. The terminal may also need to communicate with other Bluetooth enabled peripherals like a printer or a headset. Although communication protocols such as 802.11 and Bluetooth are designed to ensure that devices using the same protocol may operate in the same frequency band with a minimum of interference, there has heretofore been no method of coordination for the use of these wireless devices in the same frequency operating under different communication protocols.

It is additionally desirable to provide voice service using the Bluetooth communications protocol, for example, between a belt-mounted terminal and a headset worn by the user. Bluetooth supports voice communications using Synchronous Connection Oriented (SCO) voice packets which are transmitted every 3.75 ms. The requirement for such frequent Bluetooth packet transmission makes it difficult to coordinate voice transmission using the Bluetooth SCO packets with 802.11 communications.

It is therefore an object of this invention to utilize coordination techniques to ensure that, for example, both Bluetooth and 802.11 enabled devices, may operate robustly in the same frequency band at the same time.

SUMMARY OF THE INVENTION

An embodiment of the present invention includes a first radio transceiver operating in accordance with a first communication protocol (which may be the 802.11 protocol) and using a frequency band (which may be the 2.4 GHz ISM band), a base station operating in accordance with the first communication protocol, a second radio transceiver operating in accordance with a second communication protocol (which may be the Bluetooth protocol) and using the frequency band, and a coordinator associated with the base station for, in turn, activating the first radio transceiver, deactivating the first radio transceiver, activating the second radio transceiver, and deactivating the second radio transceiver.

The first radio transceiver and the second radio transceiver may be mounted together in a housing, which may be suitable for wearing on a belt or a laptop computer or a PDA. One or more slave devices may be associated with the second transceiver and operate in accordance with the second communication protocol. The slave devices may include a scanner, worn on a user's finger and capable of transmitting bar code information to the second transceiver, a printer, or a personal data managing device.

In one arrangement wherein the first and second transceivers are mounted together in a housing, they may include orthogonally polarized antennas. In another arrangement a Bluetooth protocol transceiver transmits at power level of about 0 dBm. In still another arrangement, two or more sub bands within the frequency band are provided and the 802.11 protocol transceiver uses one of the two or more sub-bands and the Bluetooth protocol transceiver uses another of the two or more sub-bands. In still another arrangement in the second radio transceiver is equipped with a look-ahead function for determining whether two or more sub-bands are being used by the first radio transceiver that will also be used by the second transceiver. In still another arrangement, a coordinator is associated with the first radio transceiver for deactivating the second radio transceiver while the first radio transceiver is in use.

According to the invention, there is provided a method for operating a portable data communications device using first and second wireless data communications protocol. The data communications device is operated in a power saving mode of the first communication protocol, whereby the device has active time periods for transmitting and receiving data communications signals using the first communications protocol and dormant time periods during which the device neither transmits nor receives data communications signals using the first protocol. The data communications device is operated as a master device according to the second communications protocol whereby the data communication device controls operation of slave devices communicating therewith. The operation according to the second data communications protocol is controlled to operate only during the dormant time periods of the first protocols.

In one embodiment, a signal indicating that the active time period will commence following a predetermined time interval is provided to terminate operation according to the second data communication protocol during the predetermined time interval. The first wireless data communications protocol may be the 802.11 protocol. The second wireless communication protocol may be Bluetooth.

In another aspect of the invention, there is provided a method for operating a wireless data communications system having an access point and at least one mobile unit associated with said access point using a first wireless protocol (which may be 802.11), wherein said mobile unit is arranged to conduct wireless data communications with other units using a second wireless protocol (which may be Bluetooth). Periodic beacon signals are transmitted from the access point according to the first wireless protocol. Global clear to send signals are transmitted from the access point according to the first wireless protocol, whereby the global clear to send signals prevent mobile units from transmitting signals using the first data communications protocol during an allocated time interval within the beacon signal period. The access point is controlled to avoid transmissions during the allocated time interval, and the mobile unit is operated in response to the global clear to send signal to conduct wireless communications acting as a master unit using the second wireless protocol during the allocated time interval.

In one embodiment, the beacon signal period is divided into three time intervals, wherein the access point conducts power saving mode data communications during a first time interval, wherein the access point conducts data communications using the second communications protocol during the second time interval and wherein the access point conducts data communications using the first wireless protocol during a third time interval. The first time interval may immediately following the beacon signal. In another embodiment, the first time interval may not be utilized.

In accordance with another aspect of the invention, there is provided a method of operating a data communications system using a master-slave protocol (such a Bluetooth), wherein a master transceiver transmits to slave units during first even time slots and wherein slave units transmit to the master unit during odd time slots, and wherein the transmissions follow a predetermined frequency hop pattern at a hop rate corresponding to the time slots. The master unit is operated during a first time period of each time slot to detect interfering signals at a frequency corresponding to the following time slot. Transmission by the master transceiver is inhibited during even time slots if interfering signals have been detected during either of the current or previous time slots.

In a preferred practice, the operating step includes tuning the master unit to receive signals corresponding to the frequency allocated to the next following time slot; detecting the strength of signals received and retuning the master unit to send or receive signals corresponding to the frequency allocated to the current time slot.

In another aspect of the invention, there is provided a method for providing voice communications in a wireless data communications system having a mobile unit arranged to communicate with an access point using a first data communications protocol (such as 802.11) and arranged to communicate with other devices using a second data communications protocol (such as Bluetooth). Data corresponding to the voice communication is communicated between the access point and the mobile unit using the first data communications protocol. The data corresponding to the voice communications is communicated between the mobile unit and a portable device using the second data communication protocol. The communication is arranged at time intervals which avoid interference with the communicating using the first data communications protocol. Voice signals are converted to data corresponding to the voice signals and data signals corresponding to voice signal are converted into voice signals in the portable device.

In a preferred arrangement, the data corresponding to voice signals comprises compressed voice signal data. The communication between the mobile unit and the portable device preferably uses a Bluetooth ACL link.

According to a further aspect of the invention, there is provided a method for operating a mobile unit arranged to communicate using first and second data communication protocols operating in the same frequency band (such as 802.11 and Bluetooth) wherein the mobile unit associates with an access point and receives therefrom beacon signals demarcating time intervals according to the first communications protocol. Signals are received from the access point (such as CTS signals) designating a portion of one of the time intervals during which mobile units associated with the access point refrain from transmissions using said first data communications protocol. The mobile unit is operated as a master unit using the second data communications protocol to communicate with slave units during the designated portion of the time interval.

According to a further aspect of the invention, there is provided a method for operating a wireless data communications network having at least one access point and at least one mobile unit, including a mobile unit arranged to communicate with the access point using a first wireless data communication protocol (such as 802.11) in a first frequency band and to communicate with other devices using a second wireless data communication protocol (such as Bluetooth) in the first frequency band. Signals (such as CTS) as sent from the access point in the first communications protocol, which designate a time period wherein mobile units associated with the access point refrain from transmitting using the first data communications protocol. The mobile units operate as a master unit to conduct wireless data communications with the other devices operating as slave units using the second data communications protocol during the designated time period.

According to still another aspect of the invention, a method is provided for operating a mobile unit arranged to communicate using first and second data communications protocols operating in the same frequency band (such as 802.11 and Bluetooth), wherein the mobile unit associates with an access point. The mobile unit receives first and second control signals using the first data communications protocol. The mobile units are operated in response to the first control signals to act as a master unit and conduct data communications with slave units using the second data communications protocol. Communications by the mobile unit using the second data communications protocol is discontinued in response to the second control signal.

DESCRIPTION OF THE INVENTION

Figure 1:
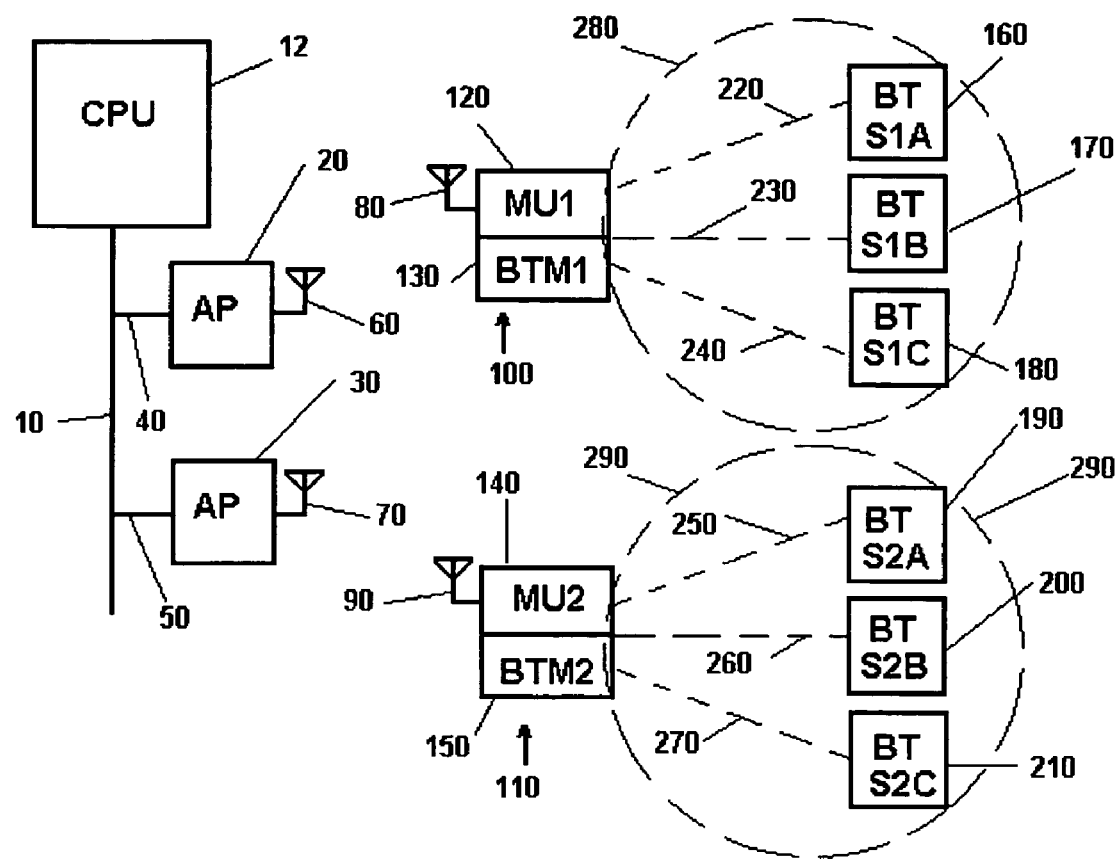
FIG. 1 is a block diagram of a wireless communications system using 802.11 and Bluetooth devices.

Turning to FIG. 1, shown are a plurality of base stations or Access Points (APs) 20, 30 that are physically connected 40, 50 to a wired network 10. While a wired network with multiple access points connected to a CPU 12 is a typical installation, the system may use a single computer and single AP. Each AP contains apparatus 60, 70 for the transmission and reception of radio frequency (RF) signals under the 802.11 protocol. Also using the 802.11 protocol, a plurality of radio transceivers or mobile units (MUs) 120, 140 communicate using apparatus 80, 90 for the transmission and reception of RF signals. Each MU 120, 140 may also be associated with a radio transceiver which is a Bluetooth Master (BTM) device 130, 150, which together make up a dual mode devices 100, 110. The association between the MU and BTM may be, for example, by way of being physically housed in the same unit. An example of a dual mode device 100, 110 may be portable terminal worn on a belt.

Each BTM 130, 150 communicates with one or more Bluetooth Slave (BTS) devices 160, 170, 180, 190, 200, 210 via the Bluetooth protocol. The Bluetooth protocol is established such that each BTS is uniquely associated with a BTM. Thus, as illustrated, BTS1A 160, BTS1B 170, and BTS1C 180 communicate using RF signals 220, 230, 240 only with BTM1 130. This forms a piconet 280. Correspondingly, BTS2A 190, BTS2B 200, and BTS2C 210 communicate using RF signals 250, 260, 270 with BTM2 150. This forms a piconet 290. An example of a BTS may be a cordless ring scanner, a printer, or personal data managing device.

With no coordination, there will be times when the BTM 130, 150 and the associated MU 120, 140 attempt to operate at the exact same time. Since the two devices operate in the same 2.4 GHz ISM frequency band the BTM 130, 150 and the MU 120, 140 may severely interfere with one another, especially if they are housed in a dual mode device 100, 110. Therefore, there is a need for coordination between the two devices. One such coordination scheme is primarily based on time multiplexing of the 802.11 and BT radios, which is especially suitable for a controlled environment (e.g., the 802.11 and BT radios are housed in the same terminal or dual mode device). In one embodiment, the Bluetooth systems are enabled or disabled according to a global/central signal from the 802.11 AP as described herein. The central signal may also be coordinated among the two devices without coordinating with the AP.

In a further embodiment, the dual mode devices 100, 110 may be designed such that the 802.11 antennas 80, 90 have orthogonal polarization with respect to the Bluetooth antennas used to generate RF signals 220, 230, 240, 250, 260, 270. This technique may provide additional protection from 802.11 Bluetooth interference and does not require the need for centralized control.

Figure 6:
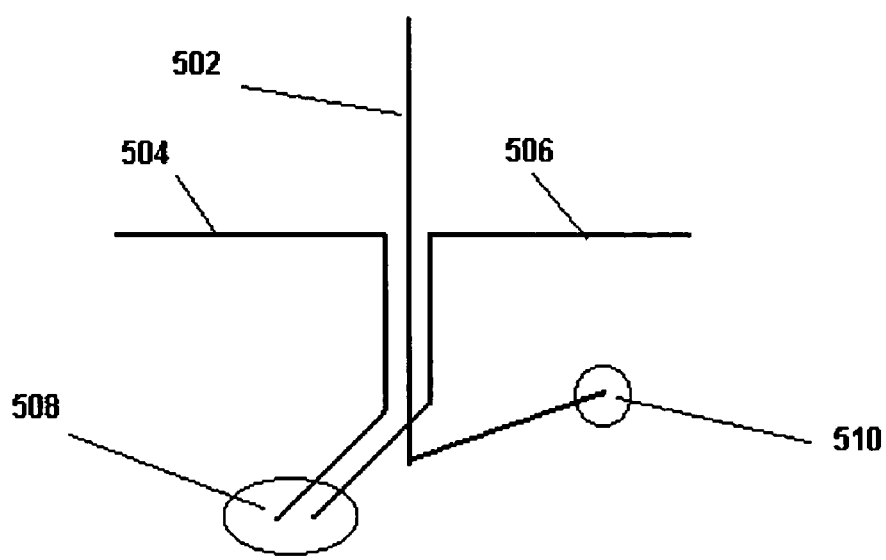
FIG. 6 is a drawing showing one example of orthogonally polarized antennas.

FIG. 6 shows one example of orthogonally polarized antennas that can be used to reduce interference. The antenna structure of FIG. 6 includes a vertically polarized monopole antenna 502, which is connected to a transmitter/receiver by an unbalanced transmission line 510. The structure also includes a horizontally polarized dipole antenna having dipole arms 504, 506 which are connected to a transmitter/receiver by balanced transmission line 508. Those skilled in the art will recognize that many other orthogonal-polarized antenna configurations may be used. In a further embodiment, the BTMs 130, 150 may be designed to transmit at a relatively low power level such as lower than 0 dBm. This technique may provide additional protection from 802.11 Bluetooth interference and may be used with other antenna or frequency coordination methods discussed herein.

In a further embodiment, the 802.11 APs 20, 30 and MUs 120, 140 may be designed to operate in one portion of the 2.4 GHz spectrum, while the BTMs 130, 150 and BTSs 160, 170, 180, 190, 200, 210 may be designed to operate in another portion of the 2.4 GHz spectrum.

In a further embodiment, the BTMs 130, 150 may be equipped with a look-ahead function to determine which frequencies within the 2.4 GHz band will be used for two or more future Bluetooth frequency hops to occur. If the BTM 130, 150 determines that one of the next two or more frequency hops will use the same frequency that the 802.11 system is using, the BTMs 130, 150 will blank their output, thus reducing the effect of the interference on the 802.11 transmissions. By using this method, interference between Bluetooth and 802.11 could be reduced or eliminated at the expense of dropping a couple of packets when channel overlap occurs. This approach may also be expanded to include the blanking of adjacent channels that may also interfere with the 802.11 transmissions.

Bluetooth uses a Frequency Hopping Spread Spectrum (FHSS) radio, which hops much faster than most IEEE 802.11 radios. Bluetooth sends a short packet as it dwells on a given frequency. Most IEEE 802.11 radios hop much slower and send much longer packets. Also there are versions of IEEE 802.11 WLANs that use Direct Sequence Spread Spectrum (DSSS) which do not hop and occupy a wide band.

As a result, during the transmission of an IEEE 802.11 packet the Bluetooth radio hops across many frequencies and potentially sends a packet on each frequency. These Bluetooth packets can interfere with the IEEE 802.11 packets and cause the IEEE 802.11 packet to be in error. The IEEE 802.11 packet needs to be retransmitted, and once again may be destroyed by the signal from the Bluetooth radio.

Figure 5:
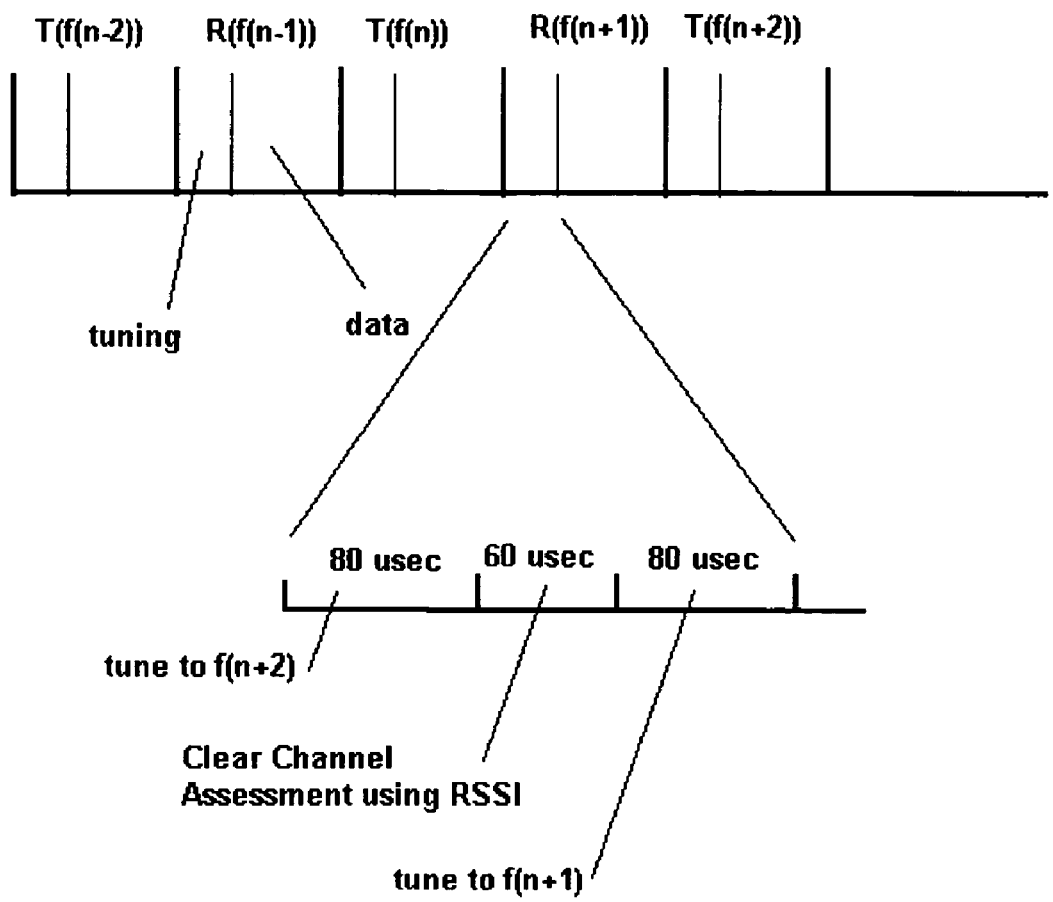
FIG. 5 is a diagram showing a modified Bluetooth operating method for avoiding interference.

This technique shown in FIG. 5 can be used in any Bluetooth radio and in any device that will operate in an IEEE 802.11 WLAN environment. Since it detects devices radiating in the 2.4 GHz ISM band it could also be used to prevent interference with other devices in that band.

A Bluetooth network consists of up to eight Bluetooth devices operating in a piconet. The piconet has one master and up to seven slaves. All the Bluetooth devices in the piconet hop in unison, at a rate of 1600 hops/second. The time that the frequency hopper dwells on a given frequency is called the slot time. At this hop rate the slot time is 625 microseconds. Typically packets are completed within one slot time, however, it is also possible to have 3 and 5 slot packets. The master and the slaves take turns transmitting, with the master transmitting on even slots and the slaves transmitting on odd slots. See also Bluetooth Specification, version 1.0, Dec. 1, 1999, which is hereby incorporated by reference in full.

There are two types of links between the master and each of the slave devices in a Bluetooth piconet. There is an asynchronous connection-less link (ACL) which is used to transfer data. There is also a synchronous connection oriented link (SCO) that is used to transfer voice data. The master in the picolink determines when data on an ACL link is transferred. Data is transferred when the master has data to send to a slave or the master wants to receive data from a slave.

Each Bluetooth device within a piconet frequency hops in unison, according to a pseudo random sequence. FIG. 5 illustrates a device hopping along its sequence of frequencies: f(1), f(2), . . . f(n) . . . The figure also shows how the 625-microsecond slot time includes a 220-microsecond period for tuning the frequency synthesizer in the radio to a new frequency and a 405-microsecond data transmission period.

As stated above during even slots T(f) the master transmits to a slave and during odd slots R(f) the slave transmits back to the master. The master can transmit on any even time slot. The slave can only transmit to the master in a time slot if the master sent the slave a packet in the previous time slot. If the master does not send data to any slave in slot n then no slave can transmit in slot (n+1). The exception to this rule is for SCO link packets in which data is always transmitted in predefined periodic intervals. So for ACL links if the master does not transmit any data, the slaves do not send any data.

Currently the piconet master does not attempt to determine if any other devices are using the spectrum before it transmits. As a result, if there is an IEEE 802.11 packet currently being transmitted the Bluetooth master will not bother to check to see if this other system is transmitting and will itself transmit at the same time, and possibly on the same frequency. As a result it will interfere with the IEEE 802.11 packet possibly causing the packet to be received incorrectly.

It is proposed to subdivide the 220 microsecond tuning time interval into several subintervals and to spend some of that time looking ahead into subsequent frequencies to see if there is any other devices transmitting in those channels. The reason to look ahead is that if the a master sends a message to slave #1 on frequency f(n), then the master has cleared slave #1 to transmit during the next time slot on frequency f(n+1). Therefore, the master needs to look ahead to the frequency that corresponds to the next slot. The 220 microsecond timing interval can be subdivided as follows. In the first 80 microseconds the frequency synthesizer in the master retunes to f(n+1), then in the next 60 microseconds the master listens for any signal in that band. This can be done using a standard Receive Strength Signal Indicator (RSSI) in the radio. Then in the next 80 microseconds the frequency synthesizer then retunes the radio to f(n). FIG. 5 illustrates the new proposed time slot subdivision.

Just prior to receiving on frequency f(n−1) the master checks to see that the frequency band at f(n) is clear. Also, prior to transmitting on frequency f(n) the master also makes sure that the frequency band f(n) is clear. If frequency bands f(n) and f(n+1) are clear then the master will transmit on frequency band f(n) and as a result allow the slave to transmit on frequency band f(n+1), in the next time slot.

During a time slot R the master likewise checks the frequency band that it will use to transmit in the following time interval. If that time slot is occupied, it will not transmit.

Figure 3:
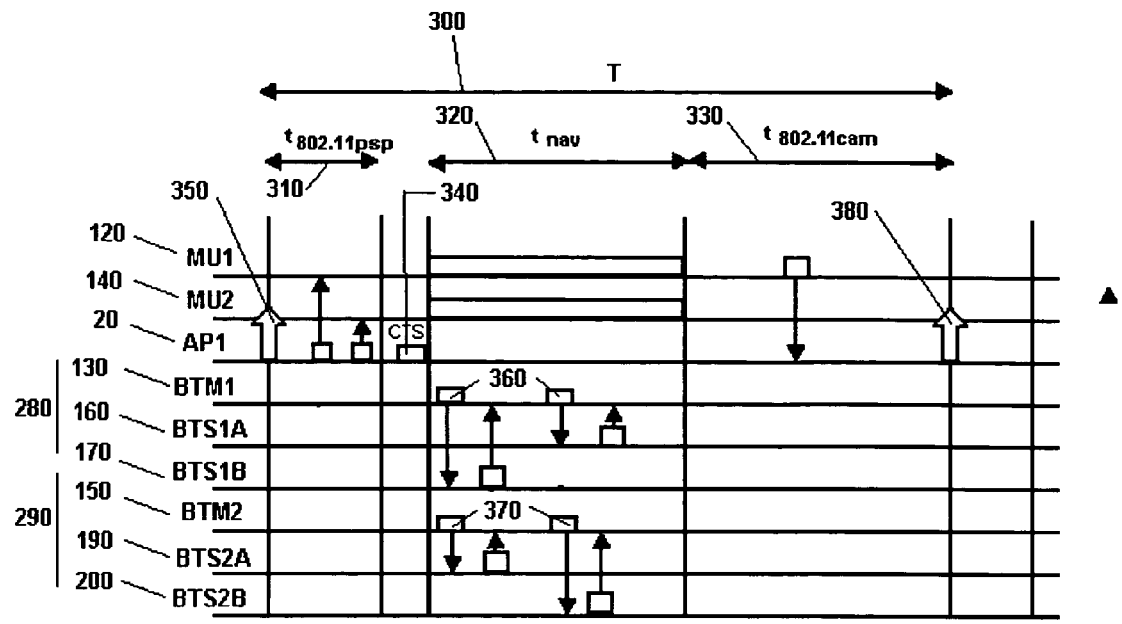
FIG. 3 is a schematic diagram of an embodiment of the present invention illustrating a coordinated time line between the operation of 802.11 and Bluetooth devices.

Referring now to the schematic of FIG. 3 in conjunction with the physical layout shown in FIG. 1. There is shown another technique to coordinate transmissions. Every 802.11 beacon time period, T 300, may be divided into three time intervals: 802.11 communications in the power saving (PSP) mode—$t_{802.11PSP}$ 310, Bluetooth communications—$t_{NAV}$ 320, and 802.11 communications in the active mode CAM—$t_{802.11CAM}$ 330. The duration of time intervals T, $t_{802.11PSP}$, $t_{NAV}$, and $t_{802.11CAM}$ depend on traffic characteristics and application needs (e.g., time critical services). At the beginning of each beacon period 300, AP 20 sends a beacon signal 350 to the 802.11 PSP MU's 120, 140 that wake up in this period (some PSP MU's may wake up in a different beacon). During this period the PSP MU's 120, 140 receive and transmit their packets according to the 802.11 protocol. Once all the PSP MU's 120, 140 receive their packets, the AP 20, may optionally send a global Clear to Send (CTS) signal 430 to shut down all the 802.11 communications for a NAV (Network Allocation Vector) period. At this point the 802.11 MUs 120, 140 will enable their associated BTMs 130, 150 (which may be housed in the same dual mode devices 100, 110) so the piconets 280, 290 associated with these BTMs 130, 150 may begin BT communications 360, 370. After completion of the NAV period 320 the BTM 130, 150 radios are disabled and all BT communications is ceased. The rest of the time (until the next beacon 380) is dedicated for 802.11 Continuously Aware Mode (CAM) MU's (not shown) that operate according to the 802.11 protocol.

In a further embodiment, the $t_{802.11PSP}$ 310 time interval may be eliminated if the MUs do not operate in PSP mode. Here, the CTS signal 340 would trigger only $t_{NAV}$ 320 and $t_{802.11CAM}$ 330 time intervals for every 802.11 beacon period, T 300.

In a further embodiment, the $t_{802.11CAM}$ 330 time interval may be eliminated if the MUs do not operate in CAM mode. Here, the CTS signal 340 would trigger only $t_{NAV}$ 320 and $t_{802.11PSP}$ 310 time intervals for every 802.11 beacon period, T 300.

In a further embodiment, the Bluetooth systems are enabled or disabled according to a global/central signal from the dual mode devices 100, 110 instead of from an AP 20.

Figure 4:
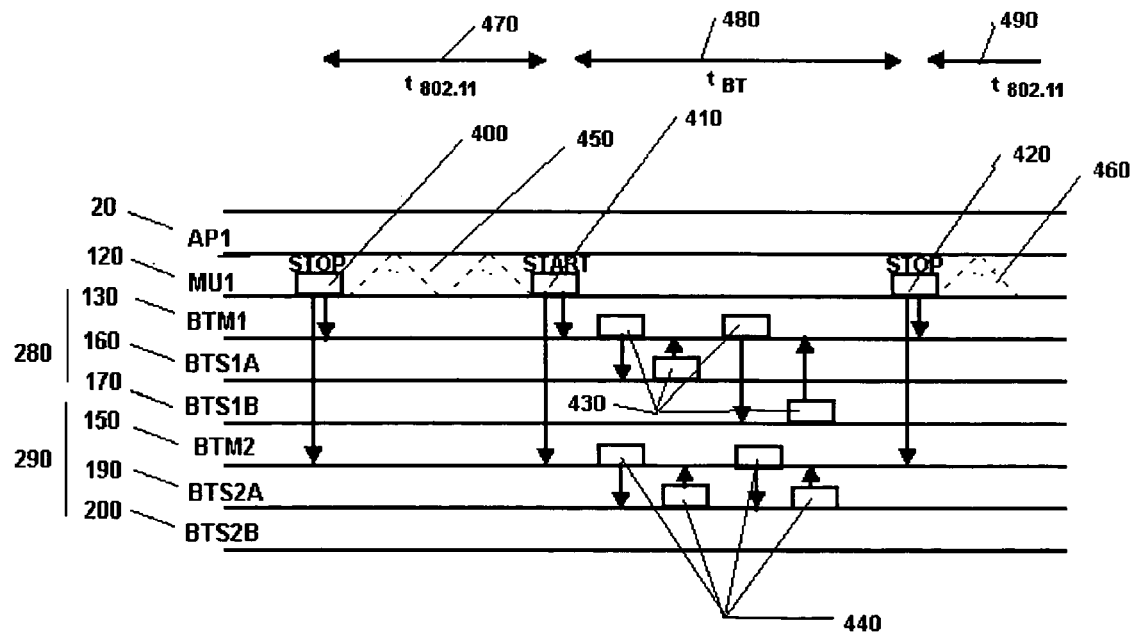
FIG. 4 is a schematic diagram of an embodiment of the present invention illustrating another coordinated time line between the operation of 802.11 and Bluetooth devices.

A further embodiment of the present invention may be demonstrated by referring to the schematic of FIG. 4 in conjunction with the physical layout shown in FIG. 1. In this approach there is no need for the 802.11 APs to coordinate between Bluetooth and 802.11 transmission. Instead, the Bluetooth network operates in the ordinary course until a 802.11 MU instructs one or all of the Bluetooth masters to stop transmitting messages to the Bluetooth slaves. When using Asynchronous Connectionless (ACS) packets, the Bluetooth master controls access to the medium for its piconet. Thus, if the masters stops transmitting the slaves stop as well. Once the 802.11 MU has completed its communication, the Bluetooth masters are allowed to resume communicating with the Bluetooth slaves. This technique is especially useful when all the 802.11 MUs are in PSP mode, because these devices are in suspended mode during most of the time.

As shown in FIG. 4, when the MU 120 desires to initiate 802.11 communication, its sends a STOP signal 400 to the BTMs 130, 150. The MU 120 then communicates 450 using the 802.11 protocol with the AP 20. When the MU 120 is finished communicating for the period $t_{802.11}$ 470 and is ready to resume its power save mode, the MU 120 communicates a START signal 410 to the BTMs 130, 150. The BTMs 130, 150 may then proceed to communicate 430, 440 using the BT protocol with their respective BTSs 160, 170, 190, 200 during the period $t_{BT}$ 480. When the MU 120 802.11 terminal "wakes up" to either send data or to listen for a 802.11 beacon from the AP 20, the MU 120 sends a STOP signal 420 to the BTMs 130, 150 to inform then that the MU 120 is taking over access to the medium. The MU 120 may warn the BTMs 130, 150 before it needs exclusive use of the medium, and this warning may occur, for example, about 4 μsec before access is required. This allows the BTMs 130, 150 to complete several packet transfers and then stop communicating with their respective BTSs 160, 170, 190, 200. Subsequently the MU 120 may communicate 460 with the AP 20 for a new period $t_{802.11}$ 490.

In a further embodiment, the periods $t_{802.11}$ 490 and $t_{BT}$ 480 are at fixed, predetermined intervals throughout the communications process. In a further embodiment, the periods $t_{802.11}$ 490 and $t_{BT}$ 480 are equal length of time.

In a further embodiment, a BTS 160, 170, 180, 190, 200, 210 may be, for example, a headset or voice transmission device designed to transmit voice data to the BTMs 110, 130, which is then transmitted via the 802.11 network. Voice information is normally transmitted on a Bluetooth network using the periodic Synchronous Connection Oriented (SCO) protocol. This protocol is not conducive to the transmission interruptions required to coordinate with 802.11 operation. It would be more efficient, when using Bluetooth and 802.11, to transmit voice over the Bluetooth network using the ACL protocol that is normally reserved for data transmission. To use voice transmission over Bluetooth, when used in conjunction with the frequency coordination techniques disclosed herein, the Bluetooth piconet 280, 290 needs to compress and decompress the voice information in order to use the ACL protocol normally reserved for data transmissions.

Figure 7:
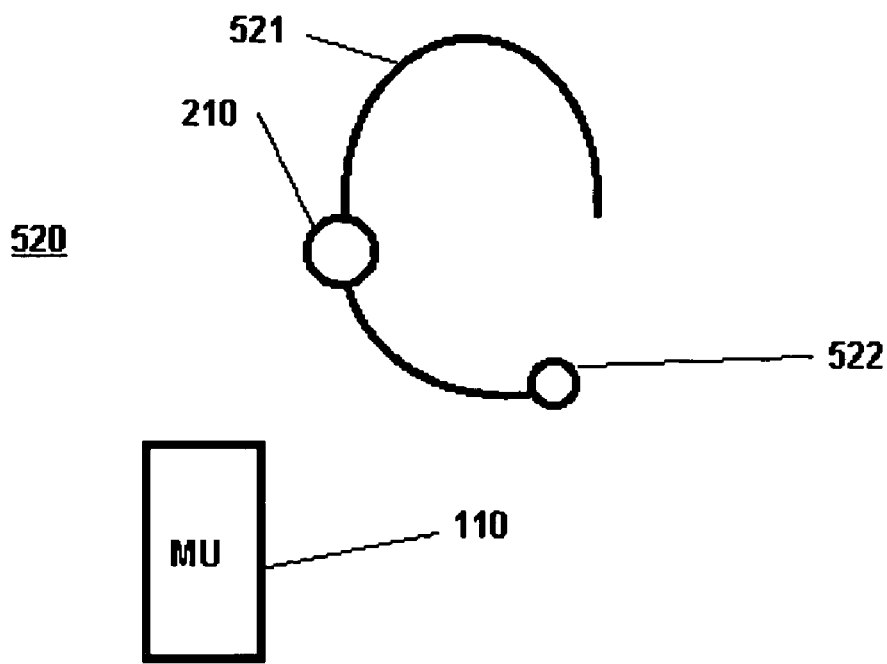
FIG. 7 is a drawing of a wireless headset arranged for voice communications.
Figure 8:
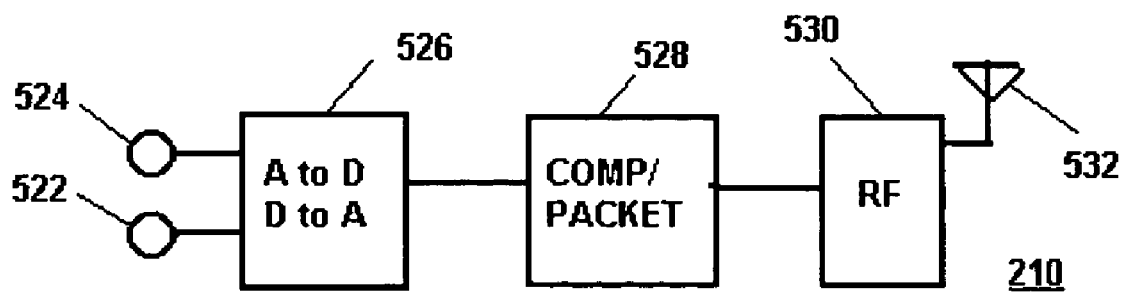
FIG. 8 is a block diagram of the headset of FIG. 7.

Referring to FIGS. 7 and 8, there is shown a voice communication system 520 including a headset 521 having a BTS radio unit 210 which communicates with a dual mode mobile unit 110 using the BT protocol. The headset 521 includes an earphone in the same housing as radio unit 210 and a microphone 522. Mobile unit 110 may be arranged to be worn on the belt of a user. As shown in FIG. 8, BTS 210 include microphone 522, earphone 524, and D to A and A to D converter 526 for converting sound signals to digital signals and vice versa. Digitized sound signals are compressed and arranged in packets in processor 528 and transmitted using RF module 530 and antenna 532. The reverse process is used for received signals. RF module 530 communicates with MU 110 using BT protocol in the ACL mode.

Figure 2:
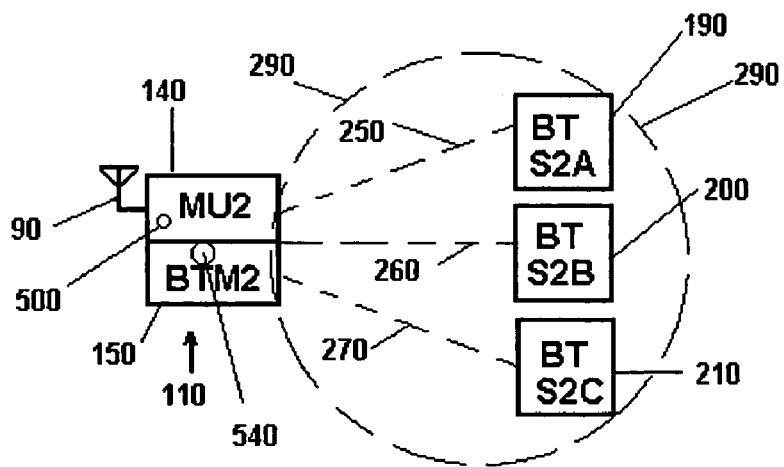
FIG. 2 is a block diagram of a wireless communications system using 802.11 and Bluetooth devices at the same time along with a connect button switch and connected indicators.

Another issue that results from attempts to coordinate 802.11 and Bluetooth devices is ensuring that the lower power Bluetooth devices are actually operating in conjunction with the higher power 802.11 devices. In this regard, a further embodiment of the present invention may be demonstrated by referring to FIG. 2. FIG. 2 is substantially similar to a portion of FIG. 1, with the addition of a connect button 500 that provided on MUs 140 of the 802.11 network and light 540. The connect button 500, may be physically mounted on a dual mode device 110. When activated by the user, the connect button 500 instructs the mobile units 140 to stop transmitting (timeout) for a preset amount of time. For example, the timeout could last for 10 seconds. This timeout would allow the Bluetooth piconet 290 to establish operations free from interference from 802.11 devices for the timeout period. Once established, the piconet 290 may activate light 540 to assure the user that the Bluetooth piconet 290 has in fact, been established. Once the timeout period ends, other methods for frequency coordination as described herein may be utilized.

While there have been described what are believed to be the preferred embodiments of the present invention, those skilled in the art will recognize that other changes and modifications may be made thereto without departing from the spirit of the present invention, and it is intended to claim all such changes and modifications as fall within the true scope of the invention.

We claim:

1. Apparatus for transmission coordination, comprising:
   a first radio transceiver operating in accordance with a first communication protocol and using a frequency band and configured to communicate with a base station in accordance with the first communication protocol;

a second radio transceiver operating in accordance with a second communication protocol and using the frequency band; and a coordinator associated with the base station for operating the base station to transmit command signals, in turn, activating the first radio transceiver, deactivating the first radio transceiver, activating the second radio transceiver, and deactivating the second radio transceiver, wherein a first communication utilizing the first communication protocol and a second communication utilizing the second communication protocol are carried out at the same time, and further wherein the second radio transceiver only transmits while the first radio transceiver is not transmitting and the first radio transceiver only transmits while the second radio transceiver is not transmitting.

2. The apparatus of claim 1, wherein the frequency band is about 2.4 GHz.

3. The apparatus of claim 2, wherein the first communication protocol is the IEEEE 802.11 protocol.

4. The apparatus of claim 3, wherein the second communication protocol is the Bluetooth protocol.

5. The apparatus of claim 4, wherein the first radio transceiver and the second radio transceiver are mounted together in a housing.

6. The apparatus of claim 5, wherein the housing is suitable for wearing on a belt.

7. The apparatus of claim 5, further comprising one or more slave devices associated with the second transceiver and operating in accordance with the second communication protocol.

8. The apparatus of claim 7, wherein at least one of the one or more slave devices is a scanner capable of being worn on a user's finger.

9. The apparatus of claim 8, wherein the scanner is capable of transmitting bar code information to the second transceiver.

10. The apparatus of claim 7, wherein at least one of the one or more slave devices is a printer.

11. The apparatus of claim 7, wherein at least one of the one or more slave devices is a personal data managing device.

12. The apparatus of claim 5, wherein the period between activating the first radio transceiver and deactivating the first radio transceiver comprises a first time period and wherein the period between activating the second radio transceiver and deactivating the second radio transceiver comprises a second time period, and wherein the first time period and second time period are at fixed, predetermined intervals.

13. The apparatus of claim 12, wherein the first time period and the second time period are of equal intervals.

14. The apparatus of claim 5 wherein said command signals are global clear to send (CTS) signals.

15. Apparatus for transmission coordination, comprising:

a first radio transceiver operating in accordance with a first communication protocol having a power save operating mode and using a frequency band, a base station operating in accordance with the first communication protocol;

a second radio transceiver operating in accordance with a second communication protocol and using the frequency band, wherein the first radio transceiver and the second radio transceiver are mounted together in a housing;

a coordinator associated with the housing, for deactivating the first radio transceiver and activating the second radio transceiver when said first radio transceiver is in said power save mode.

16. The apparatus of claim 15, wherein the frequency band is about 2.4 GHz.

17. The apparatus of claim 16, wherein the first communication protocol is the IEEE 802.11 protocol.

18. The apparatus of claim 17, wherein the second communication protocol is the Bluetooth protocol.

19. Apparatus for transmission coordination, comprising:

a first radio transceiver operating in accordance with a first communication protocol and using a frequency band, a base station operating in accordance with the first communication protocol;

a second radio transceiver operating in accordance with a second communication protocol and using the frequency band, wherein the first radio transceiver and the second radio transceiver are mounted together in a housing;

a coordinator associated with the housing, for, in turn, activating the first radio transceiver, deactivating the first radio transceiver, activating the second radio transceiver, and deactivating the second radio transceiver wherein the period between activating the first radio transceiver and deactivating the first radio transceiver comprises a first time period and wherein the period between activating the second radio transceiver and deactivating the second radio transceiver comprises a second time period, and wherein the first time period and second time period are at fixed, predetermined intervals.

20. The apparatus of claim 19, wherein the first time period and the second time period are of equal intervals.

21. Apparatus for transmission coordination, comprising:

a first radio transceiver operating in accordance with an IEEE 802.11 protocol and using a frequency band of about 2.4 GHz, the frequency band of about 2.4 GHz having two or more sub-bands;

a base station operating in accordance with the IEEE 802.11 protocol;

a second radio transceiver operating as a master in accordance with a Bluetooth protocol wherein a first sub band is used by a Bluetooth master and a second sub band is used by a Bluetooth slave and using the frequency band of about 2.4 GHz;

wherein the second radio transceiver is equipped with a look-ahead function for determining whether signals are present on the first and second sub-bands.

22. A method for operating a portable data communications device using first and second wireless data communications protocol comprising:

operating said data communications device in a power saving mode of said first communication protocol, whereby said device has active time periods for transmitting and receiving data communications signals using said first communications protocol and dormant time periods during which said device neither transmits nor receives data communications signals using said first protocol;

operating said data communications device as a master device according to said second communications protocol whereby said data communication device controls operation of slave devices communicating therewith; and controlling said operation according to said second data communications protocol to operate only during said dormant time periods.

23. A method for operating a portable data communications device using first and second wireless data communications protocol comprising:

operating said data communications device in a power saving mode of said first communication protocol, whereby said device has active time periods for transmitting and receiving data communications signals using said first communications protocol and dormant time periods during which said device neither transmits nor receives data communications signals using said first protocol;

operating said data communications device as a master device according to said second communications protocol whereby said data communication device controls operation of slave devices communicating therewith; and controlling said operation according to said second data communications protocol to operate only during said dormant time periods wherein said controlling comprises providing a signal indicating that said active time period will commence following a predetermined time interval and terminating operation according to said second data communication protocol during said predetermined time interval.

24. A method as specified in claim 22 wherein said first wireless data communications protocol is the IEEE 802.11 protocol.

25. A method as specified in claim 24 wherein said second wireless communication protocol is Bluetooth.

26. A method for providing voice communications in a wireless data communications system having a mobile unit arranged to communicate with an access point using a first data communications protocol and arranged to communicate with other devices using a second data communications protocol, comprising:

communicating data corresponding to said voice communication between said access point and said mobile unit using said first data communications protocol;

communicating said data corresponding to said voice communications between said mobile unit and a portable device using said second data communication protocol, said communication being arranged at time intervals which avoid interference with said communicating using said first data communications protocol; and converting voice signals to data corresponding to said voice signals and converting data signals corresponding to voice signal into voice signals in said portable device, wherein communications utilizing the first data communication protocol and communications utilizing the second data communication protocol are carried out at the same time, and further wherein said mobile unit transmits to said access point only when said mobile unit is not transmitting to said portable device and said mobile unit transmits to said portable device only when said mobile unit is not transmitting to said access point.

27. A method as specified in claim 26 wherein said data corresponding to voice signals comprises compressed voice signal data.

28. A method as specified in the claim 26 wherein said first communications protocol is the IEEE 802.11 protocol.

29. A method according to claim 28 wherein said second communication protocol is Bluetooth.

30. A method according to claim 29 wherein said communication between said mobile unit and said portable device uses a Bluetooth ACL link.

31. A method as specified in claim 30 wherein said data corresponding to voice signals comprises compressed voice signal data.

* * * * *